US006404652B1

(12) United States Patent
Takebayashi et al.

(10) Patent No.: US 6,404,652 B1
(45) Date of Patent: Jun. 11, 2002

(54) RELAY TERMINAL

(75) Inventors: Yasuhiro Takebayashi; Kazushige Matsuoka; Taisuke Ueda; Ryo Sugihara; Hirofumi Iwanaga; Tsuyoshi Maekawa, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/436,209

(22) Filed: Nov. 8, 1999

(30) Foreign Application Priority Data

Nov. 6, 1998 (JP) .......................................... 10-331971
Jun. 25, 1999 (JP) .......................................... 11-180366

(51) Int. Cl.[7] .................................................. H02B 1/01
(52) U.S. Cl. ........................ 361/824; 439/707; 439/713
(58) Field of Search ......................... 361/626, 790–791, 361/819, 822–824; 439/709, 712–714, 716, 718, 521, 596, 467, 76.2

(56) References Cited

U.S. PATENT DOCUMENTS

| | | | | | |
|---|---|---|---|---|---|
| 3,887,259 | A | * | 6/1975 | Ayer | 361/823 |
| 4,766,521 | A | * | 8/1988 | Pelletier | 361/823 |
| 5,877,944 | A | * | 3/1999 | Onizuka | 361/826 |
| 6,152,758 | A | * | 11/2000 | Matsuoka | 439/76.2 |

* cited by examiner

*Primary Examiner*—Greg D. Thompson
(74) *Attorney, Agent, or Firm*—Morrison & Foerster LLP

(57) ABSTRACT

A relay terminal includes a plurality of relays, a connector for entering control signals to control the relays and outputting contact inputs from their relay contacts, and a terminal block corresponding to the input and output signals of the relays, which are held as a single unit. The holding construction of the plurality of relays and the terminal block employs a two step overlapping holding construction in which the relays are held in an upper step and the terminal block is held in a lower step, resulting in a reduction in the width of the relay terminal and an increase in a package density when the relay terminal is mounted on a vertical installation wall within a control panel.

7 Claims, 20 Drawing Sheets

RELAY TERMINAL

BACKGROUND OF THE INVENTION

1. Field of the Invention

This invention relates to a relay terminal interposed between an input-and-output unit of a programmable controller and a load to be controlled, and more particularly, to an improved relay terminal having a two step overlapping arrangement In which a relay group and terminal block are stacked vertically, thereby reducing an exclusive occupation area for installation on a control panel.

2. Description of the Related Art

Generally, if desired, a relay terminal is interposed between an input-and-output unit of a programmable controller and a load to be controlled. With such a construction that the load to be controlled is driven by employing such a relay terminal has tho advantages that the security of relay burnout is high, the degree of freedom about the selection of a power source is high, and the relay terminal may be arranged close to the load, in comparison with a direct drive system where the load to be controlled is directly driven by an input-and-output unit attached to a programmable controller.

Such a conventional relay terminal, however, employs a flat component construction in which a terminal block is mounted on a front area of a sheet of wiring board and a group of relays are mounted on a rear area of the board, and requires a large occupation area in a vertical direction when it is mounted on a vertical mounting wall within a control panel, thereby reducing the package density of the control panel.

SUMMARY OF THE INVENTION

It is, therefore, a primary object of this invention to provide a relay terminal capable of having a small occupation area on a mounting wall and increasing its package density.

According to the first aspect of this invention, there is provided a relay terminal including a plurality of relays, a connector for entering control signals to control the relays and outputting contact inputs from their relay contacts, and a terminal block corresponding to the input and output signals of the relays, which are held as a single unit, and the holding construction of the plurality of relays and the terminal block employs a two step overlapping holding construction in which the relays are hold in an upper step and the terminal block is held in a lower step. According to this relay terminal, the occupation width may be reduced in a vertical direction to improve the package density when the relay terminal is mounted on a vertical installation wall within a control panel.

According to the second aspect of this invention, there is provided a relay terminal according to the first aspect of this invention, further including an upper side holding member holding the plurality of relays and a lower side holding member holding the terminal block, in which a combination construction of the upper aide holding member and the lower side holding member is designed to be selectively set to a first condition in which the relays cover the upper of the terminal block or a second condition in which the relays do not cover the upper face of the terminal block. According to this relay terminal, the upper side holding member serves as a terminal block cover by taking the first condition on an electrically conductive condition, while screw work, when a wiring work of the terminal block is necessary, is eased by taking the second condition.

According to the third aspect of this invention, there is provided a relay terminal according to the second aspect of this invention, in which a terminal plate of the terminal block housed within the lower side holding member is extended to a connecting portion of the upper side holding member, the upper side holding member is inserted by a conductive member that is conductive with the terminal plate when the both holding member, are positioned to the first condition, and an end of the conductive member is exposed on an external wall of the holding member to provide a check terminal.

According to this relay terminal, when the upper and lower side holding members are positioned in the first condition, the check terminal is exposed on a surface of the upper side holding member, whereby operational confirmations or electrical checks may be easily performed by contacting a tester rod or the like to the check terminal.

According to the fourth aspect of this invention, there is provided a relay terminal according to the third aspect of this invention, in which the end of the terminal plate serves as a plug pin extending to the connecting portion of the upper side holding member, and the conductive member inserted. into the upper side holding member serves as a socket pin. According to this relay terminal, as the upper and lower side holding members are combined into the first condition, the plug pin and the socket pin are ensured to be conductive, thereby ensuring an electrical connection between the terminal or the terminal block and the check terminal.

According to the fifth aspect of this invention, there is provided a relay terminal according to one of the third and fourth aspects of this invention, in which a tip end of the check terminal is accommodated by a stepped concave hole disposed on a surface of the upper side holding member. This relay terminal prevents the check terminal from being carelessly contacted by a metal piece on the electrical conductors, whereby an unexpected accidental ground path may be avoided.

According to the sixth aspect of this invention, there is provided a relay terminal according to one of the second through fifth aspects of this invention, in which the combination construction is constructed so that relative positions of the both upper and lower side holding members are changeable between the first and second conditions. When the upper side holding member is mounted as a cover member for the lower side holding member for an open-and-close movement according to the construction of this relay terminal, the upper side holding member in the first condition may serve as a terminal cover for the lower side holding member, and the second condition allows the screw work of the terminal block to be eased.

According to the seventh aspect of this invention, there is provided a relay terminal according to one of the second through fifth aspects of this invention, in which the combination construction is a removable combination construction which is selectively set to one of the first and second conditions. When the upper side holding member is mounted as a removable cover member for the lower side holding member according to the construction of this relay terminal, the upper side holding member in the first condition may serve as a terminal cover for the lower side holding member, and the second condition allows the screwing work of the terminal block to be eased.

According to the eighth aspect of this invention, there is provided a relay terminal according to one of the second through fifth aspects of this invention, in which the lower side holding member is provided with a mounting space for an enlarged terminal block. This construction may omit any additional space for a terminal block beside the relay terminal to be connected with a load power source.

BRIEF DESCRIPTION OF THE DRAWINGS

Other objectives and advantages of this invention will be more readily apparent from the following detailed description provided in conjunction with the following figures, of which:

Finally, FIGS. 20A and 20B show a comparison in space occupation rate between a conventional relay terminal 200 shown in FIG. 20A and the relay terminal of this invention shown in FIG. 20B. As clearly shown in FIGS. 20A and 20B, the width W1 in a vertical direction of the relay terminal 100 of the invention mounted on a vertical wall is much narrower than width 2 of the conventional relay terminal 200, thereby improving the space occupation rate by the same degree. The conventional relay terminal 200 includes the relays 7 and the terminal blocks which are closely arranged in a forward and backward direction in a planar fashion, but the terminal relay of this invention employs a two-step overlapping construction.

DETAILED DESCRIPTION OF THE PREFERRED EMBODIMENTS

Figure 1:
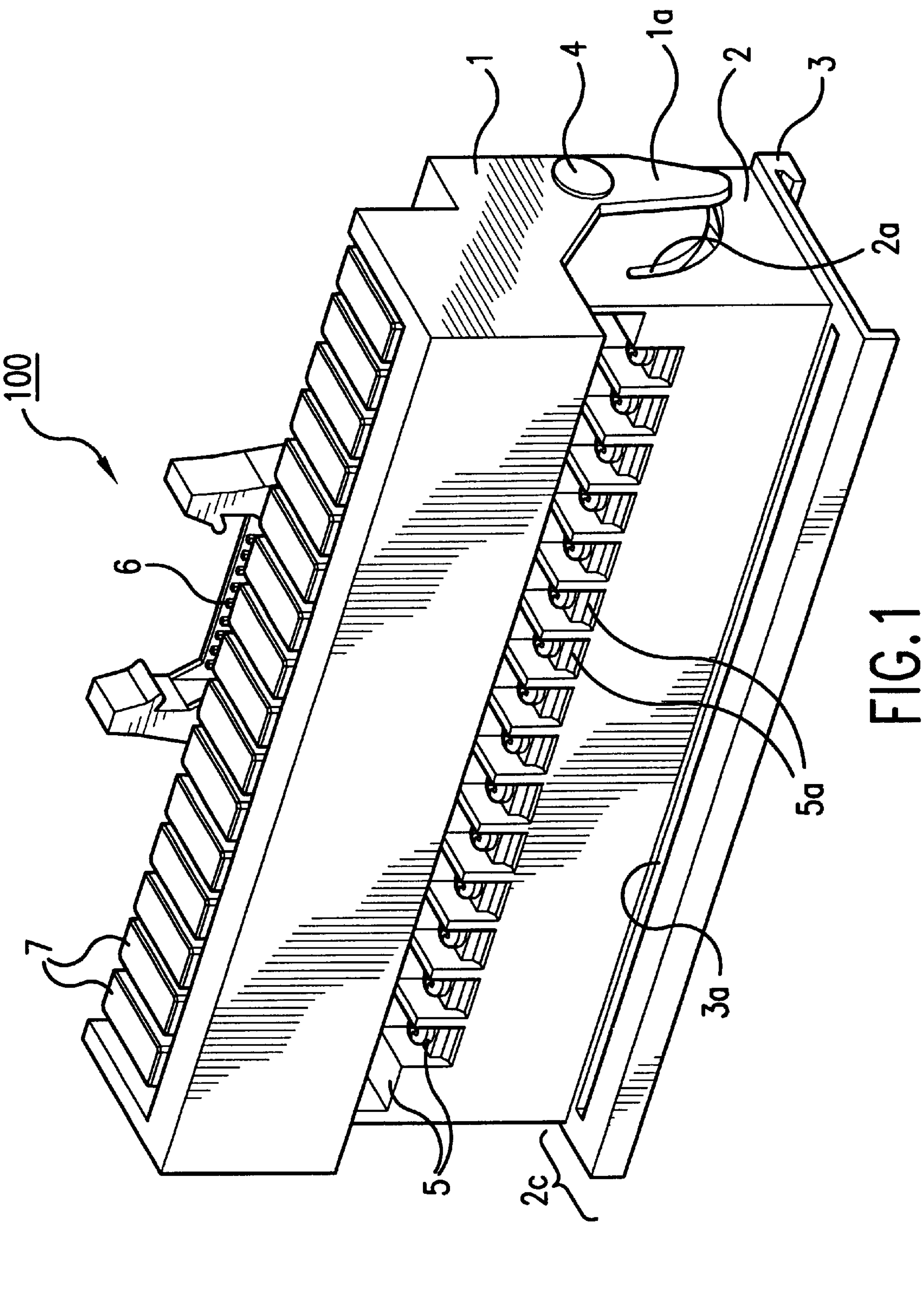
FIG. 1 is a perspective view of a relay terminal on which an enlarged terminal block is not mounted, viewed from the front and above, as a first embodiment of this invention.

Returning, now, to FIGS.1 and 2, there is shown a relay terminal 100 as a first embodiment of this invention, which includes an upper housing 1, a lower housing 2, a DIN rail mounting plate 3, a calking pin 4 which supports the swinging of the upper housing 1, a permanent terminal block 5, a connector 6, a plurality of relays 7 connected with the connector 6, and an enlarged connector terminal block 8.

Figure 3:
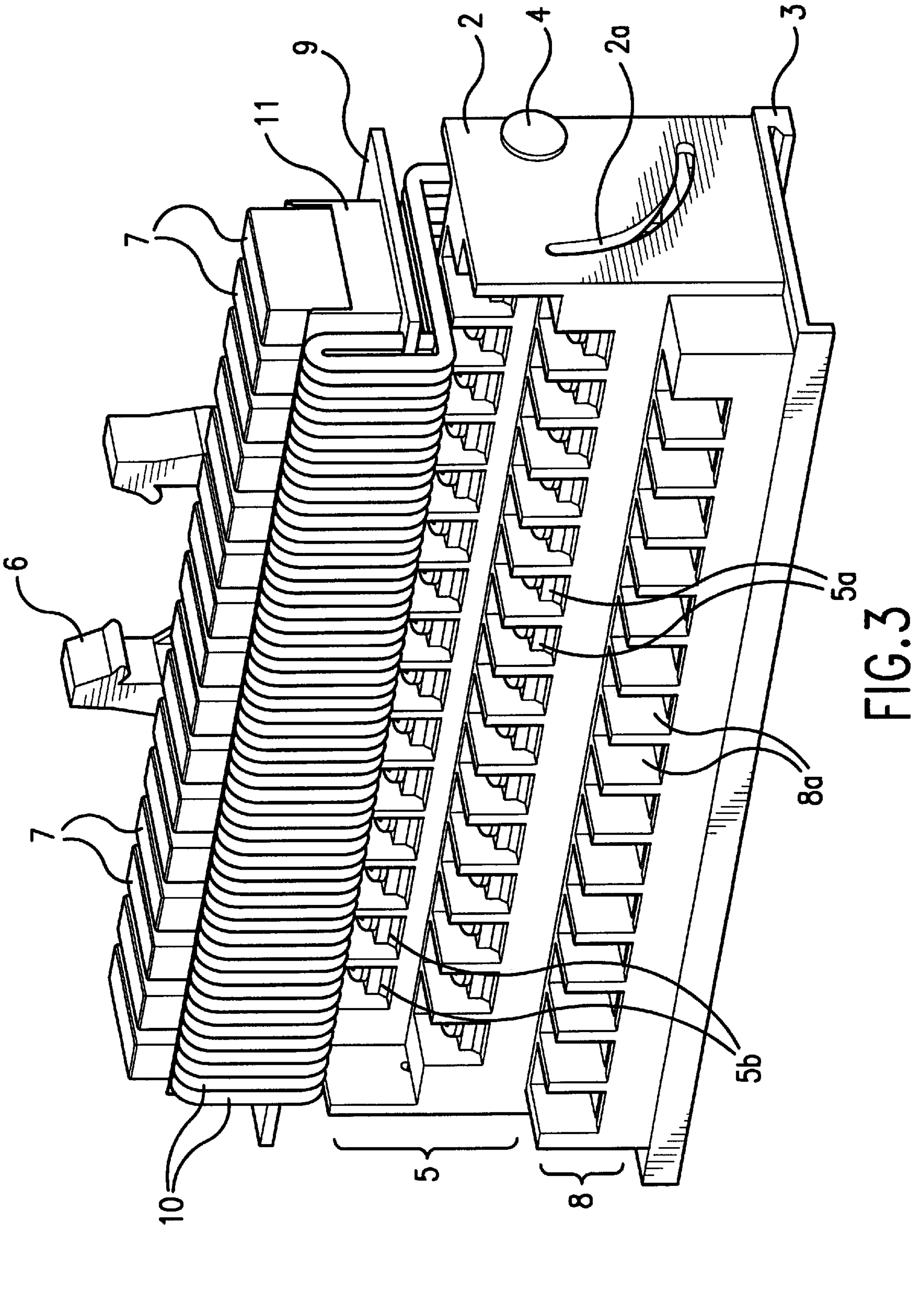
FIG. 3 is a perspective view of the relay terminal of FIG. 2 in which an upper housing in removed therefrom.
Figure 4:
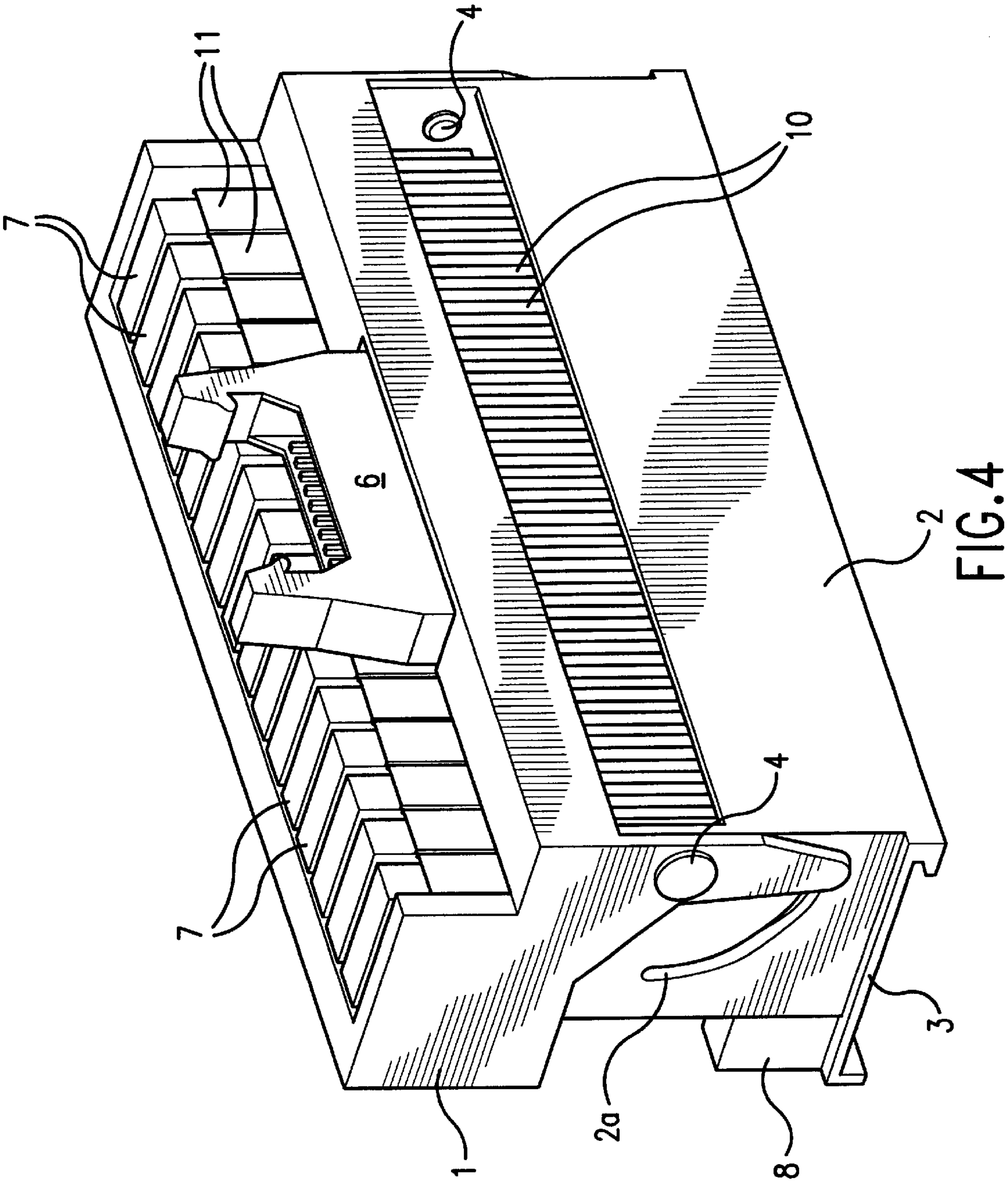
FIG. 4 is a perspective view of the relay terminal of FIG. 2 on which the enlarged terminal block is mounted, which is viewed from the rear.
Figure 5:
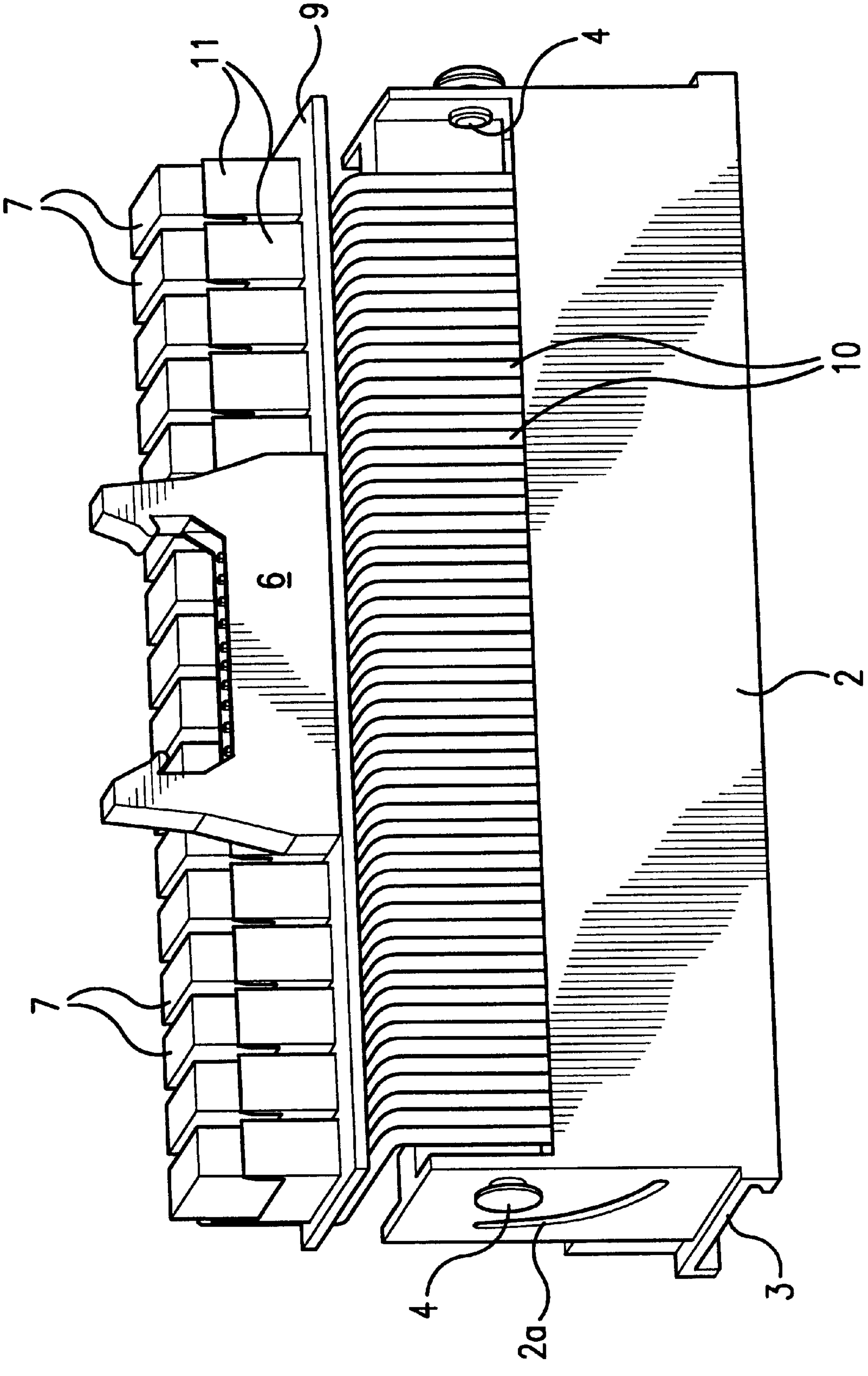
FIG. 5 is a perspective view of the relay terminal of FIG. 4 viewed by the same angle as the view of FIG. 4, wherein the upper housing is removed therefrom.

Moreover, as shown in FIG. 3 in detail, an upper board 9 in held horizontally within the upper housing 1. On this upper board 9, a plurality of sockets 11 are fixed by soldering in one line, and mounted by removable relays 7. At the back of the upper board 9, there is fixed the connector 6 by soldering it sideways. On the upper board 9, a wiring pattern is applied to the coil terminals to conduct from the sockets 11 into the pins of the connector 6. Therefore, control signals may be introduced to coils of the respective relays through the connector 6.

Figure 2:
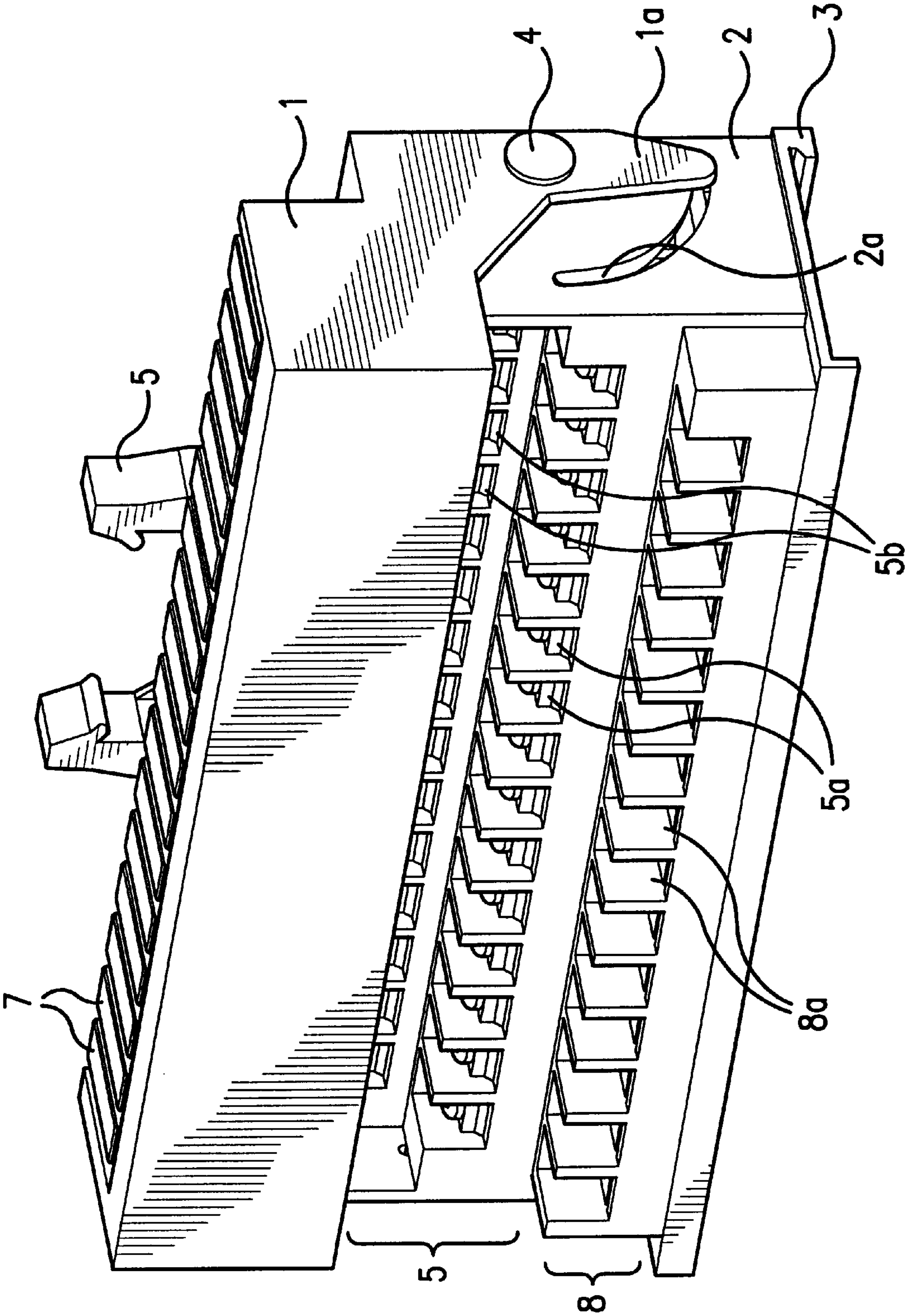
FIG. 2 is a perspective view of the relay terminal of the first embodiment, on which an enlarged, terminal block is mounted, which is viewed from the front and above.

On the other hand, the permanent terminal block 5 is held at the lower housing 2, and the DIN rail mounting plate 3 is fixed to a bottom of the lower housing 2. Therefore, the lower housing 2 can be mounted to a DIN rail through the mounting plate 3. As shown in FIG. 1, an installation space 2*c* for the enlarged terminal block 8 is set in front of the lower housing 2, and a groove 3*a* for the enlarged terminal block 8 is disposed in the installation space 2*c*. On a bottom wall of the enlarged terminal block 9, there is provided a rib (not shown in drawings) extending longitudinally. By engaging the rib with the groove 3*a* for the enlarged terminal block 8, the enlarged terminal block is fixed to the installation space 2*c*. The relay terminal where the enlarged terminal block 8 is mounted is shown in detail in FIG. 2 and its subsequent drawings.

Thus, it should be noted that the relay terminal 100 according to this embodiment includes the plurality relays 7, the connector 6 for entering control signals to control the relays and outputting contact inputs from the relay contacts, the terminal block 5 corresponding to input and output signals of the relays 7 which are held as a single unit. The holding construction of the relays 7 and the terminal block 5 has a two-step overlapping construction in which the relays 7 stand on the upper step and the terminal block 5 stands on the lower step.

The combination construction of the upper side holding member 1 which holds the relays 7 as a single unit (corresponds to the upper housing 1 in this embodiment) and the lower side holding member holding the terminal block 5 (corresponds to the lower housing 2 in this embodiment) is designed to be selectively set to a first condition in which the relays 7 cover the upper face (above) of the terminal block 5 or a second condition in which the relays 7 do not cover the upper face (above) of the terminal block 5. As explained more concretely, a lever 1*a* is disposed on a side of the first housing 1 as a single unit. A base end of the lever la is fixed to owing on a side of the lower housing 2 with the calming pin 4 as a fulcrum. On the other hand, there is disposed a projection (not shown in drawings, hidden by the lever 1*a*) on a tip of the lever 1*a* toward the lower housing 2, and an arc-shaped guide groove 2*a* is disposed on a side of the lower housing 2 corresponding to the projection. Accordingly, the whole of the upper housing 1 is adapted to swing around the calking pin 4 and its turning angle is limited by the projection on the lever 1*a* brought into contact with the upper end of the guide groove 2*a*.

Figure 6:
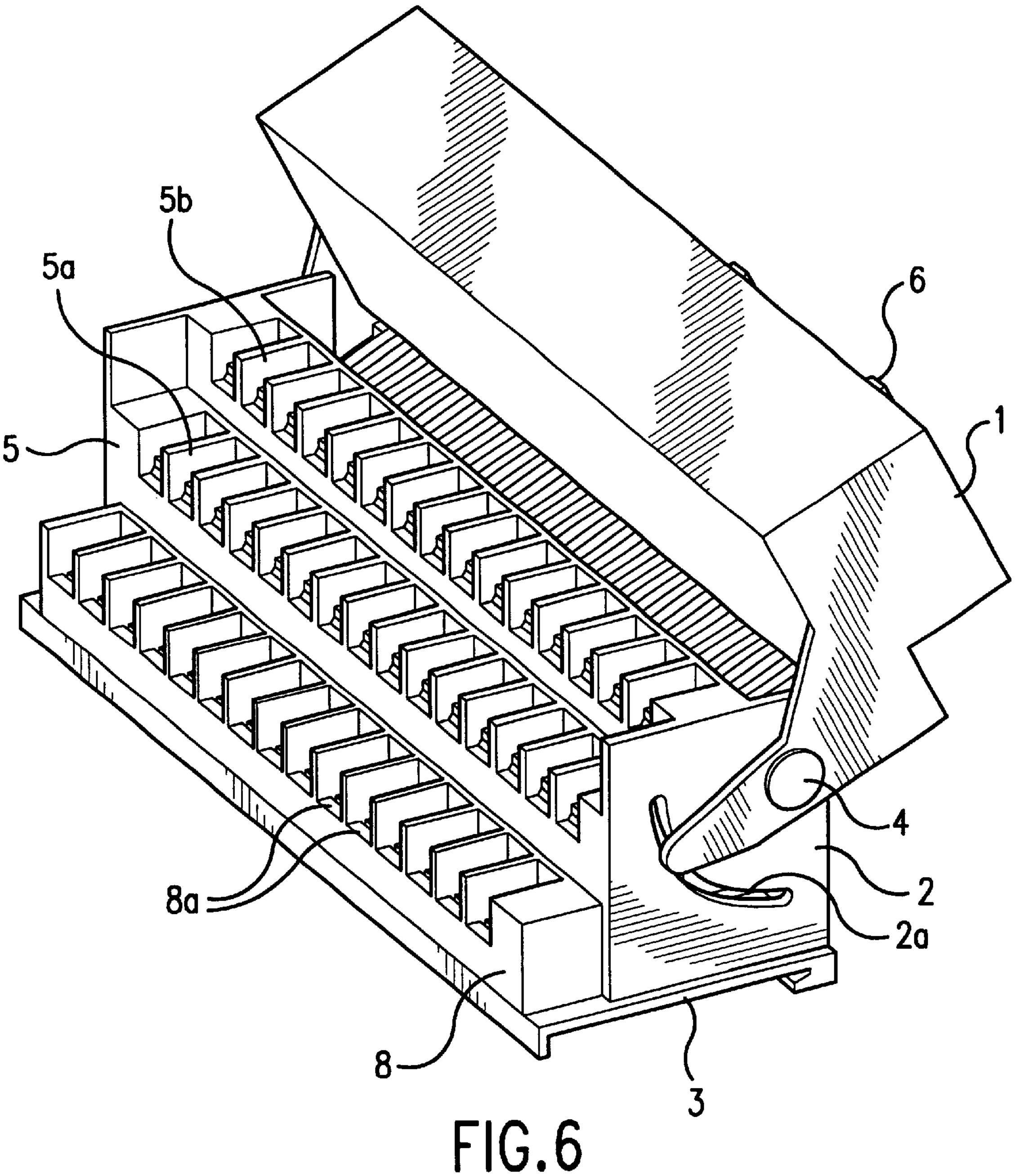
FIG. 6 is a perspective view of the relay terminal of FIG. 2 which is mounted by the enlarged terminal block and the upper housing is swung to be opened, which is viewed from the front and above.

FIG. 6 shows in detail the upper housing 1 in a partially open condition. As the upper housing is completely opened, the terminals 5*a* and 5*b* on the permanent terminal block are provided completely exposed to the upper view. This makes work of screwing the terminals easy. That is, if the upper housing 1 is swung backward and opened completely, the lower terminal 5*a* and the upper terminal 5*b* on the permanent terminal block are both exposed completely to an upper plane, so that a point of a screw driver may be inserted into the terminal 5*a* and 5*b* from right above allowing the connection work to be easy. On the other hand, if the upper housing 1 is swung opposite to this side and returned to the condition shown in FIG. 1, the upper housing 1 works as a cover for the permanent terminal block 5 mounted to the lower housing 2 and any charging portion is not exposed on any surface, thereby increasing the security. Thus, by swinging the upper housing 1 centered at the calking pin 4 opened and closed against the lower housing 2, there may be chosen one of the first condition in which the relays 7 cover the terminal block 5 and the second condition in which the relays 7 do not cover the same.

Figure 7:
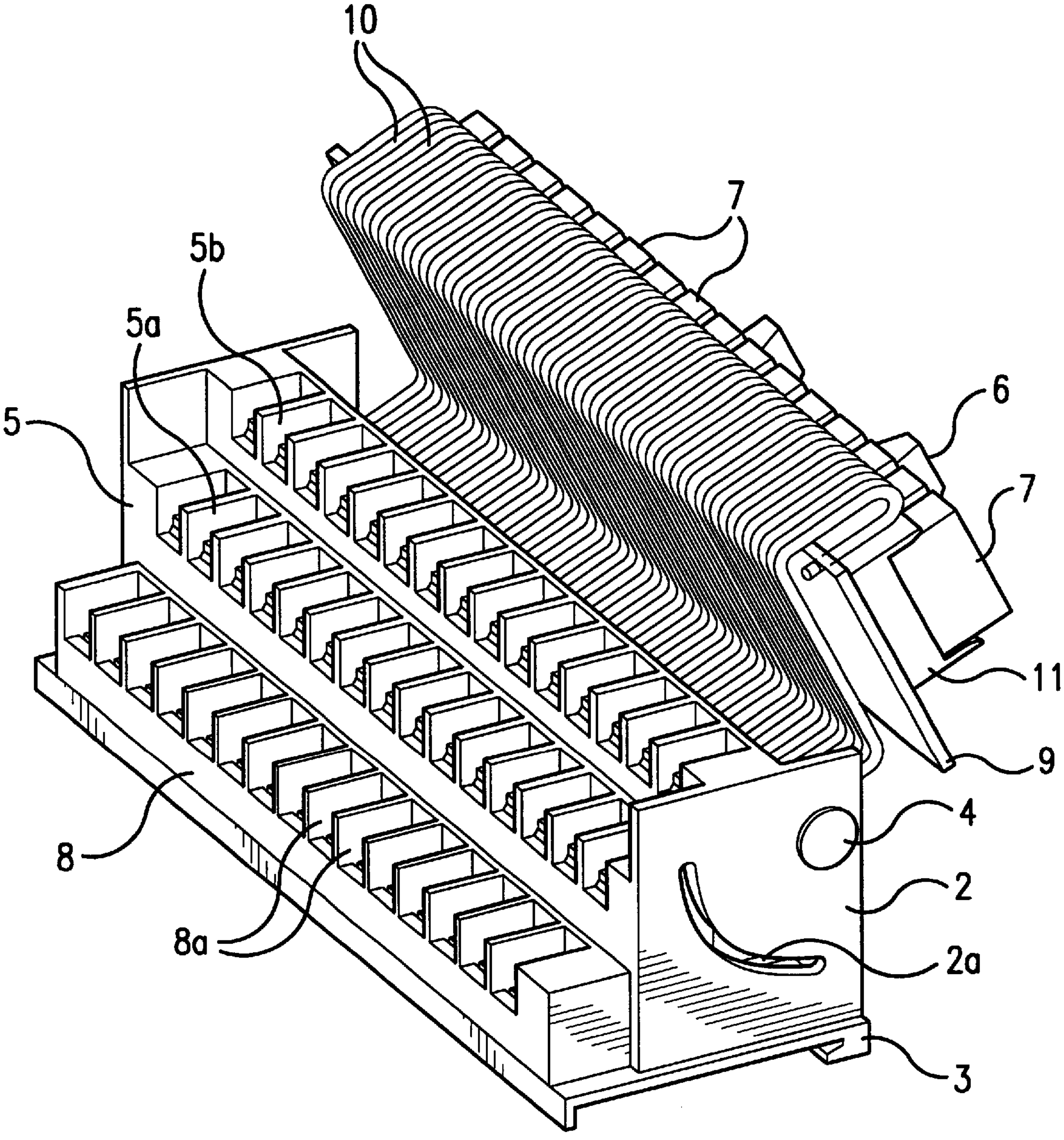
FIG. 7 is a perspective view of the relay terminal of FIG. 6 in which the upper housing is removed therefrom, which is similar view to FIG. 6.
Figure 8:
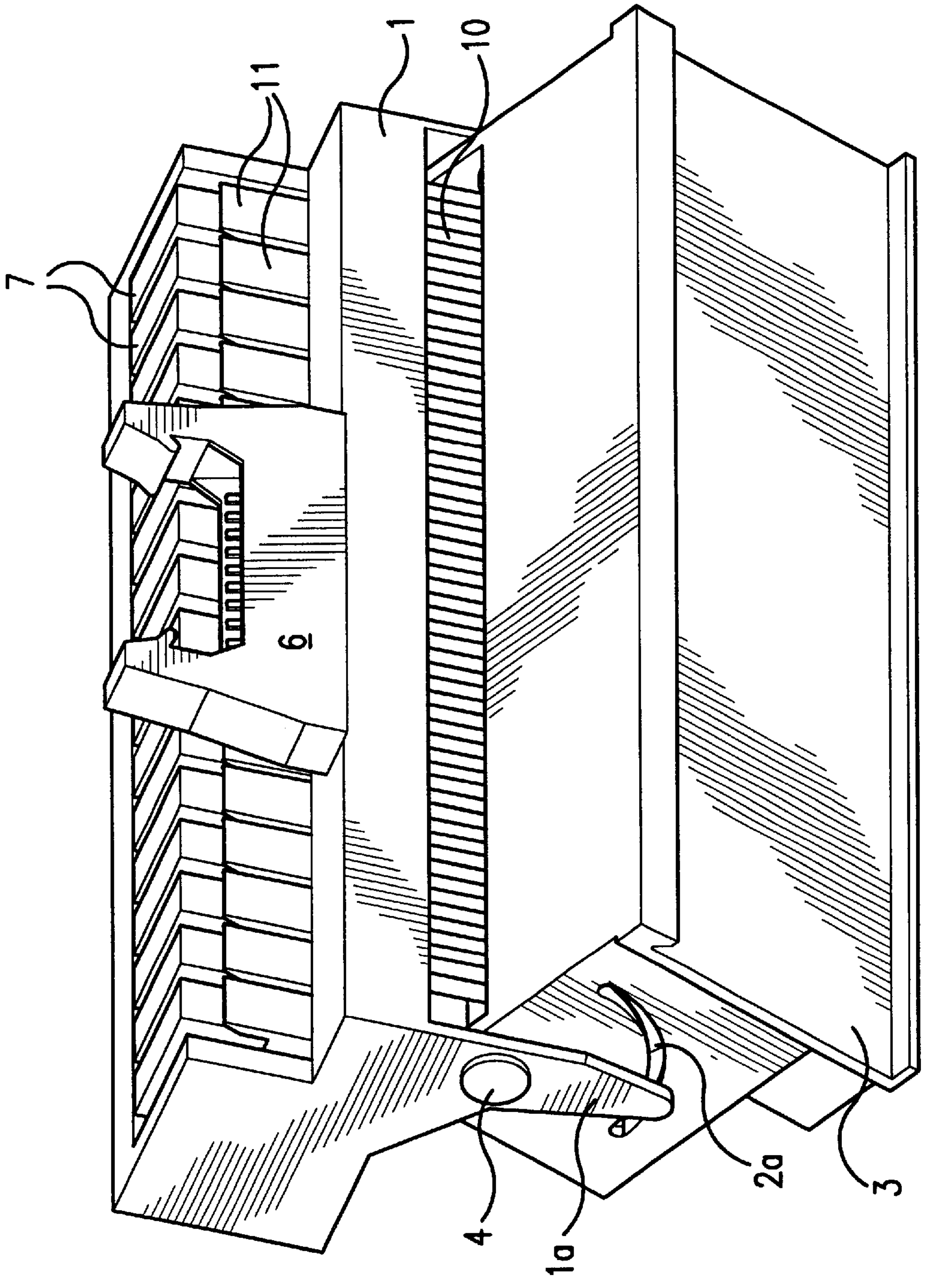
FIG. 8 is a perspective view of the relay terminal of FIG. 6 which is viewed from the back and above.
Figure 9:
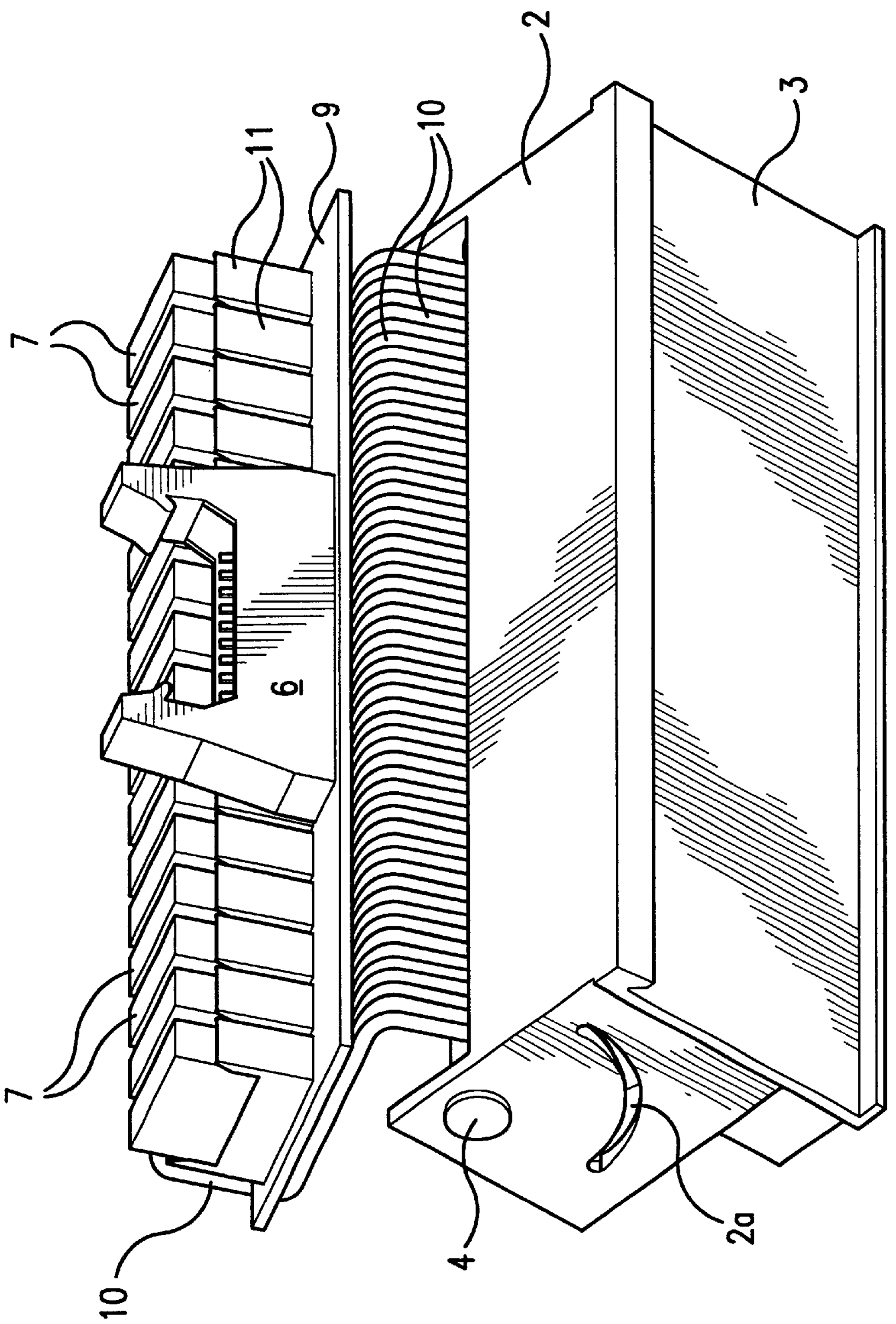
FIG. 9 is a perspective view of the relay terminal of FIG. 8 wherein the upper housing is removed therefrom, which is viewed from the back.
Figure 17:
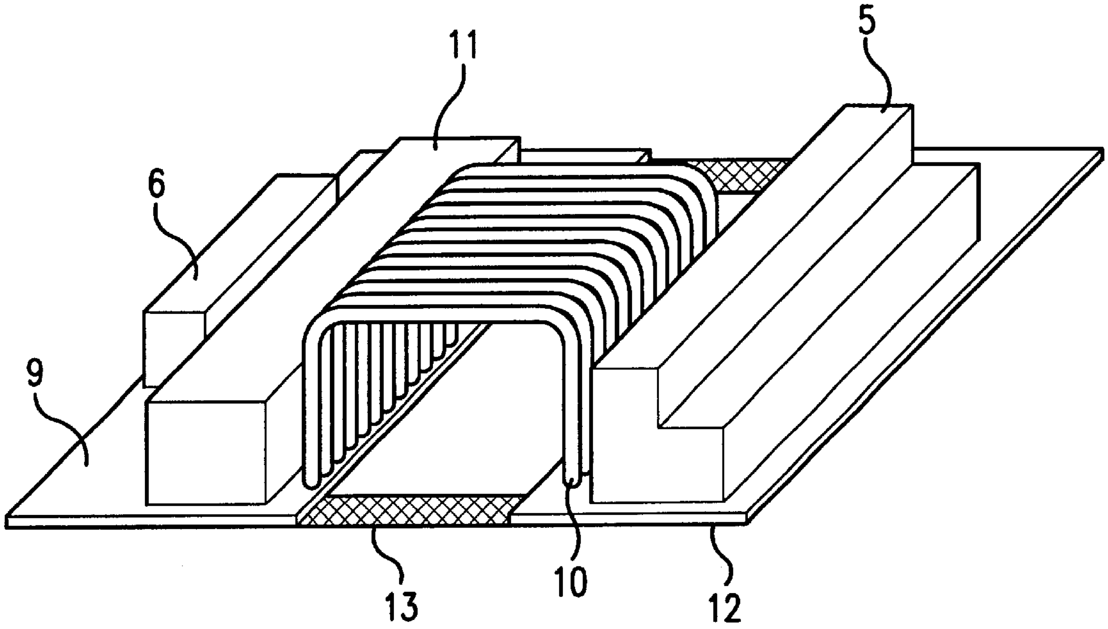
FIG. 17 is a view of the wiring board of the relay terminal of the first embodiment to explain its soldering method.

An electrical connection between the contacts of the relays 7 housed within the first housing 1 and the terminal block 5 built into the lower housing 2 will be explained hereinafter in detail. Assuming a relay terminal for output, a current capacity of around 5 Amps has to be ensured between the contacts of the relay 7 and the terminal block 5. In this case, however, it is difficult to employ any flexible wiring plate such as a flexible board or the like under current technique. Accordingly, the electrical connection is performed by a lead wire 10. It should be noted here how to guide the lead wire 10. Though not shown in drawings, the terminal block 5 is mounted on the lower board (see FIG. 17) housed within the lower housing 2 by soldering. On the lower board there is applied a wiring pattern to conduct to the upper and lower terminals 5*a* and 5*b* providing the permanent terminal block. The relays 7 and the terminal block 5 are electrically conducted by electrically connecting an edge of the wiring pattern with an edge of the wiring pattern of the upper board 9. Under common practice both boards 9 and 12 would be connected by the shortest path. As shown in FIG. 7, however, this embodiment employs a special method such that the lead wires 10 from the lower board are pulled toward a front side along a bottom wall of the upper board 9 and detoured toward an upper wall side of the upper board 9, and the tip ends of the lead wires 10 penetrate from up to down through the upper board 9 to be soldered therein. This method allows the soldering work of the upper board 9 and the lower board 12 to be finished by a single process employing a reflow furnace, thereby reducing the number of processes.

As shown in rig. 17, within the reflow furnace, the upper board 9 and the lower one 12 are jointed to each other as a single unit through a connecting portion 13, wherein the lead wires 10 are wired across the both boards. Then the soldered areas are all concentrated on the same one side of both boards 9 and 12, thereby completing the soldering work by a single process in the reflow furnace. The construction of FIG. 17 includes the permanent terminal block 5, the connector 6, the lead wires 10, the relay socket 11, the lower board 12 and the connection portion 13 of upper and lower boards.

As described above, it is important in this invention to provide a relay terminal holding as a single unit the relays, the input-and-output connector for entering control signals for controlling the relays and outputting contact inputs from the relay contacts, and the terminal blocks corresponding to the input and output signals of those relays, characterized in that the holding construction of the above-mentioned plurality of relays and the terminal-block employs a two-step overlapping construction in which the relays mentioned above stand on the upper step and the terminal block mentioned above stands on the lower step. Employment of such a construction may reduce an exclusive area on a mounting wall of a control panel in comparison with the conventional exclusive area, and improve the packaging density.

The relay terminal of this embodiment includes the upper side holding member holding the relays as a single unit, the lower side holding member holding the terminal blocks, and the combination construction of the upper side holding member and the lower side holding member which is selectively set to one of the first condition in which the relays cover the upper face of the terminal blocks and the second condition in which the relays do not cover the upper face of the terminal blocks, thereby improving the safety of the electrical conduction and ease of the connecting work.

The combination construction which may be selectively set to the first condition or the second one is not limited to the swingable combination construction shown in FIGS. 1 to 9. Other combination constructions having such a function are shown in FIGS. 10 and 11.

The combination construction employs a removable construction designed to selectively choose one of the first and second conditions. As shown in FIGS. 10 and 11, flexible tabs 1*b* extending downwardly are disposed on both right and left lower sides of the upper housing 1 as a single unit, and projections 1*c* having a hooking function are disposed on their external faces of the tabs 1*b*. Holes 2*b* are provided on both side walls of the lower housing 2 corresponding to the projections 1*c*. As the tabs 1*b* are inserted within the lower housing from above to below, the tabs 1*a* are bent and the protections 1*b* are engaged with the holes 2*b* to complete the combination.

Figure 10:
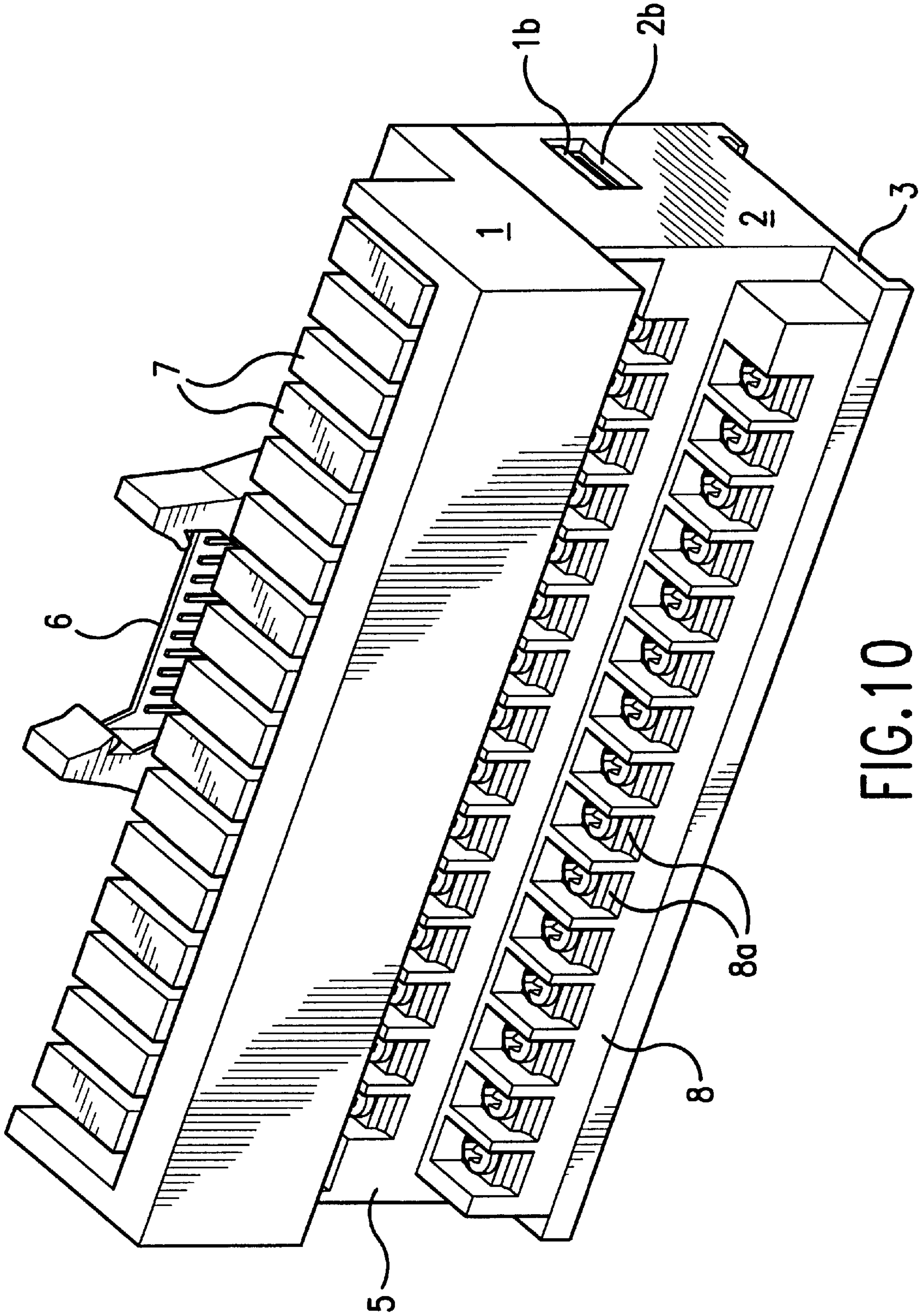
FIG. 10 is a perspective view of a relay terminal on which an enlarged terminal block is mounted, which is viewed from the front and above, as in the second embodiment of this invention.
Figure 11:
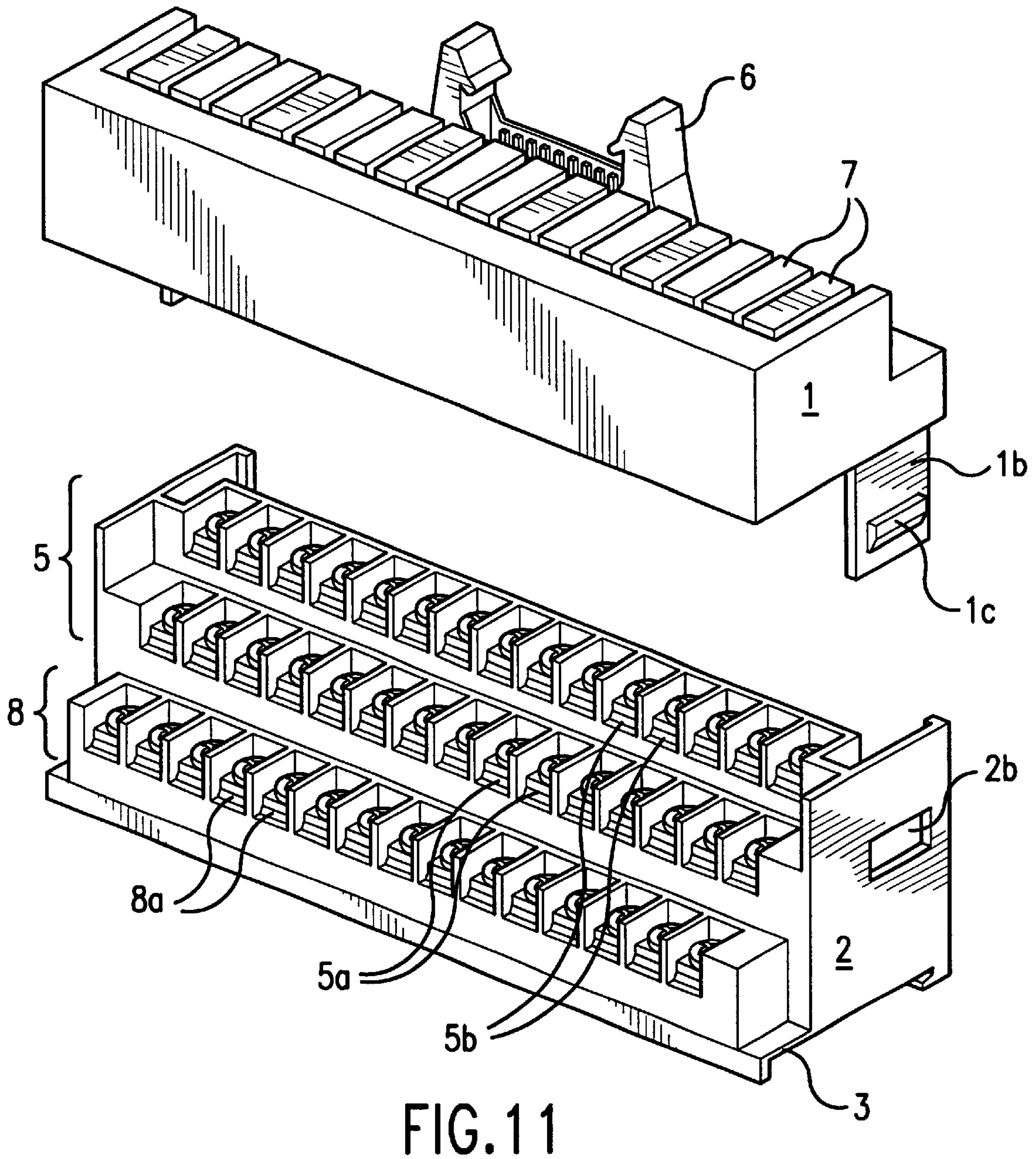
FIG. 11 is a perspective view of the relay terminal of FIG. 10 wherein an upper housing is removed from a lower housing, which is viewed from the front.

As shown in FIG. 10, after completion of the combination, the upper housing 1 holding the relays 7 covers over the permanent terminal block 5 and the enlarged terminal block 8 is held by the lower housing 2, and the upper housing 1 serves as a protective cover for the terminal blocks 5 and 8 as mentioned above. Oppositely, as the upper housing 1 is tried to be separated upwardly from the lower housing 2 by pushing in the projections 1*c* engaged with the holes 2*b* opening the lower housing 2, the tabs 1*a* are bent to release the projections 1*c* from the holes 2*b* and the upper housing 1 may be removed from the lower housing 2 as shown in FIG. 11. In the condition of FIG. 11, the terminal blocks 5 and 8 are all exposed from the upper view, and insertion of a screw driver into screws may execute a terminal connecting work without any hindrance.

In the above-mentioned first and second embodiments shown in FIGS. 1 to 11, the packaging density is improved by employing two-step overlapping of the relays and the terminal block, and the terminal block 5 is covered by the upper housing 1 when the upper housing 1 and the lover housing 2 are coupled, whereby when the coupled upper housing 1 and lower housing 2 have to be separated to expose the terminals 5*a* and 5*b* to electronically check the terminals 5*a* and 5*b*.

Figure 12:
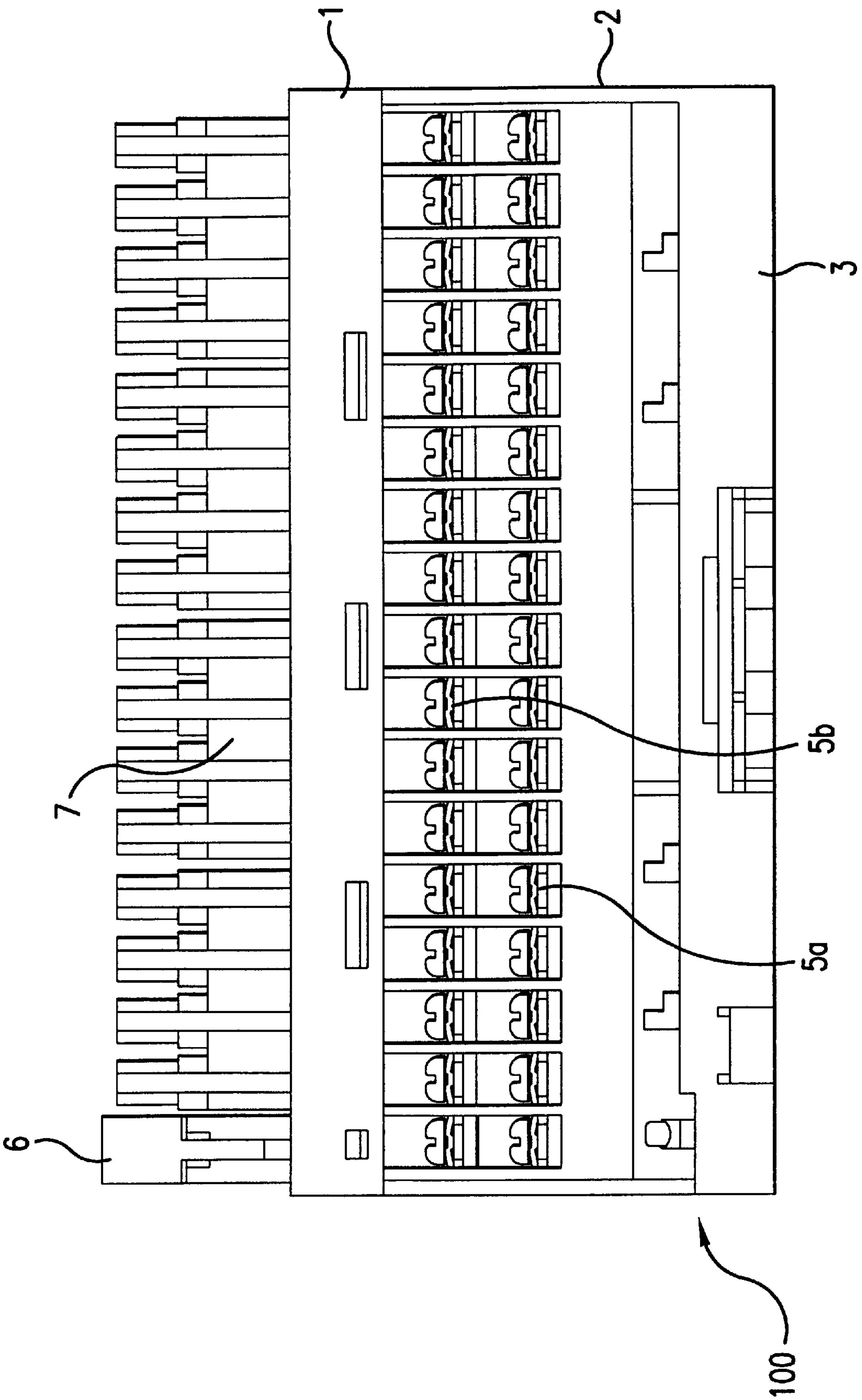
FIG. 12 is a front view of a relay terminal as in the third embodiment of this invention.
Figure 13:
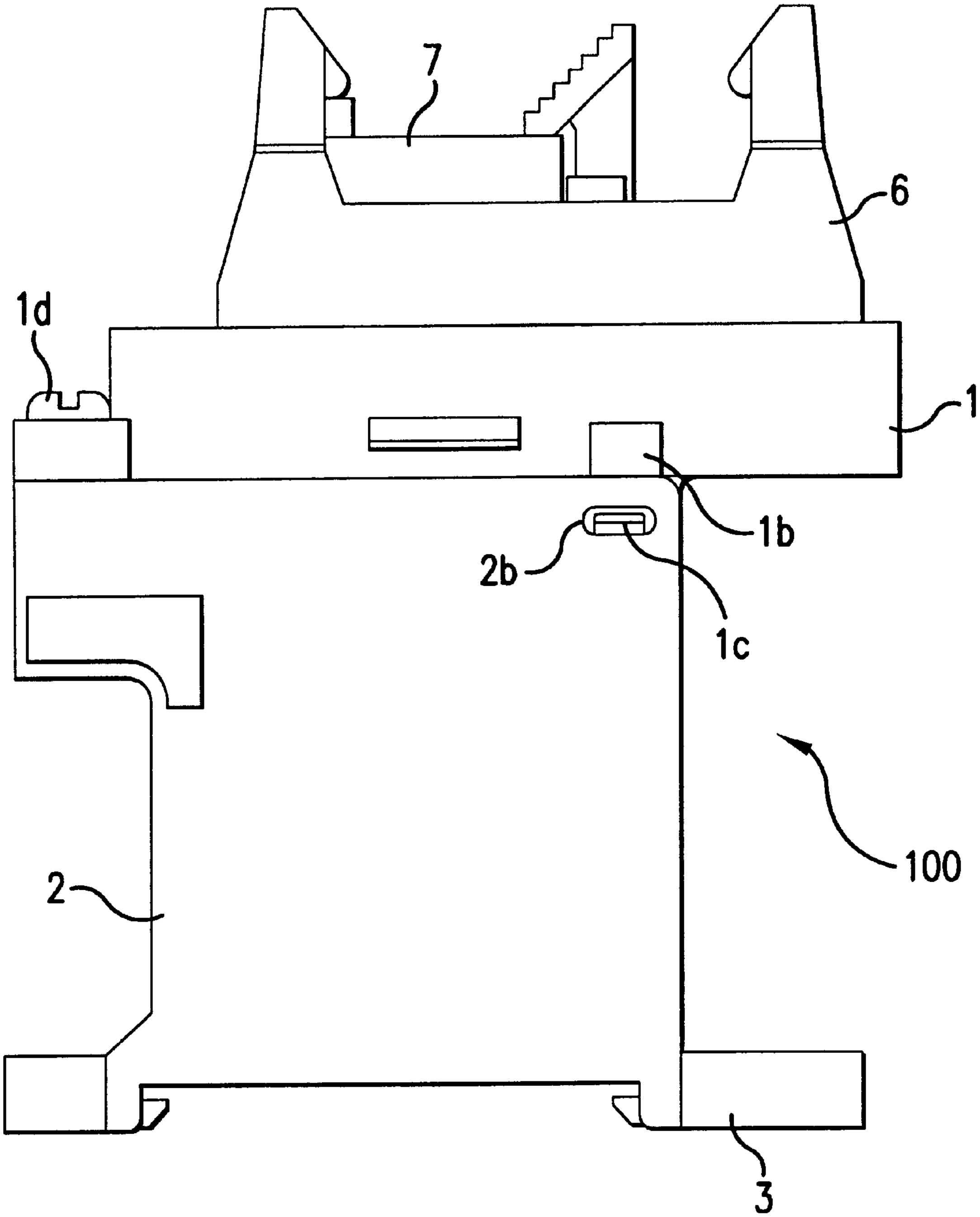
FIG. 13 is a left side view of the relay terminal of FIG. 12.
Figure 14:
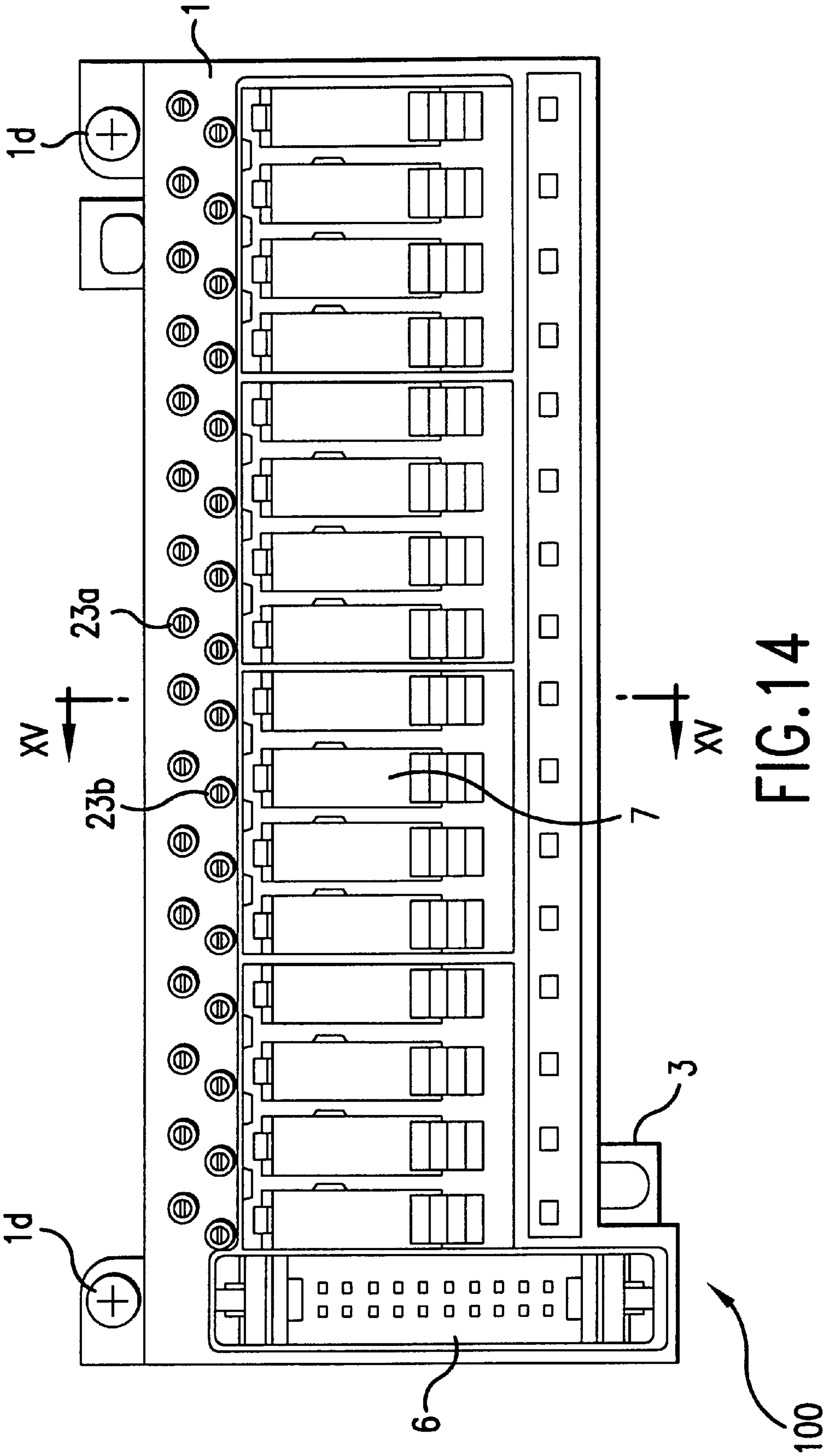
FIG. 14 is a top view of the relay terminal of FIG. 12.

In FIGS. 12 to 16 there is shown a relay terminal 100 as the third embodiment of this invention, wherein an electrical check of the terminals 5*a* and 5*b* may be performed while the upper housing 1 and the lower housing 2 remain coupled. As shown in FIGS. 12 and 13, the upper housing 1 holding relays 7 is positioned to cover the permanent terminal block 5 held by the lower housing 2, and serves as a protective cover for the terminal block 5.

In the connective construction of the upper housing 1 and the lower housing 2, flexible tabs 1*b* are downwardly disposed on lower ends of both sides of the upper housing 1 as a single unit, and projections 1*c* having a hooking function are disposed on external walls of the tabs 1*b*. Corresponding to the projections there are disposed holes 2*b* on both sides of the lower housing 2. As the tabs 1*b* are inserted within the lower housing 2 from above to bellow, the tabs 1*a* are bent to engage the projections 1*b* with the holes 2*b*, thereby the upper housing 1 and the lower housing 2 are coupled and fixed by tightening the installation screws 1*d*.

Figure 15:
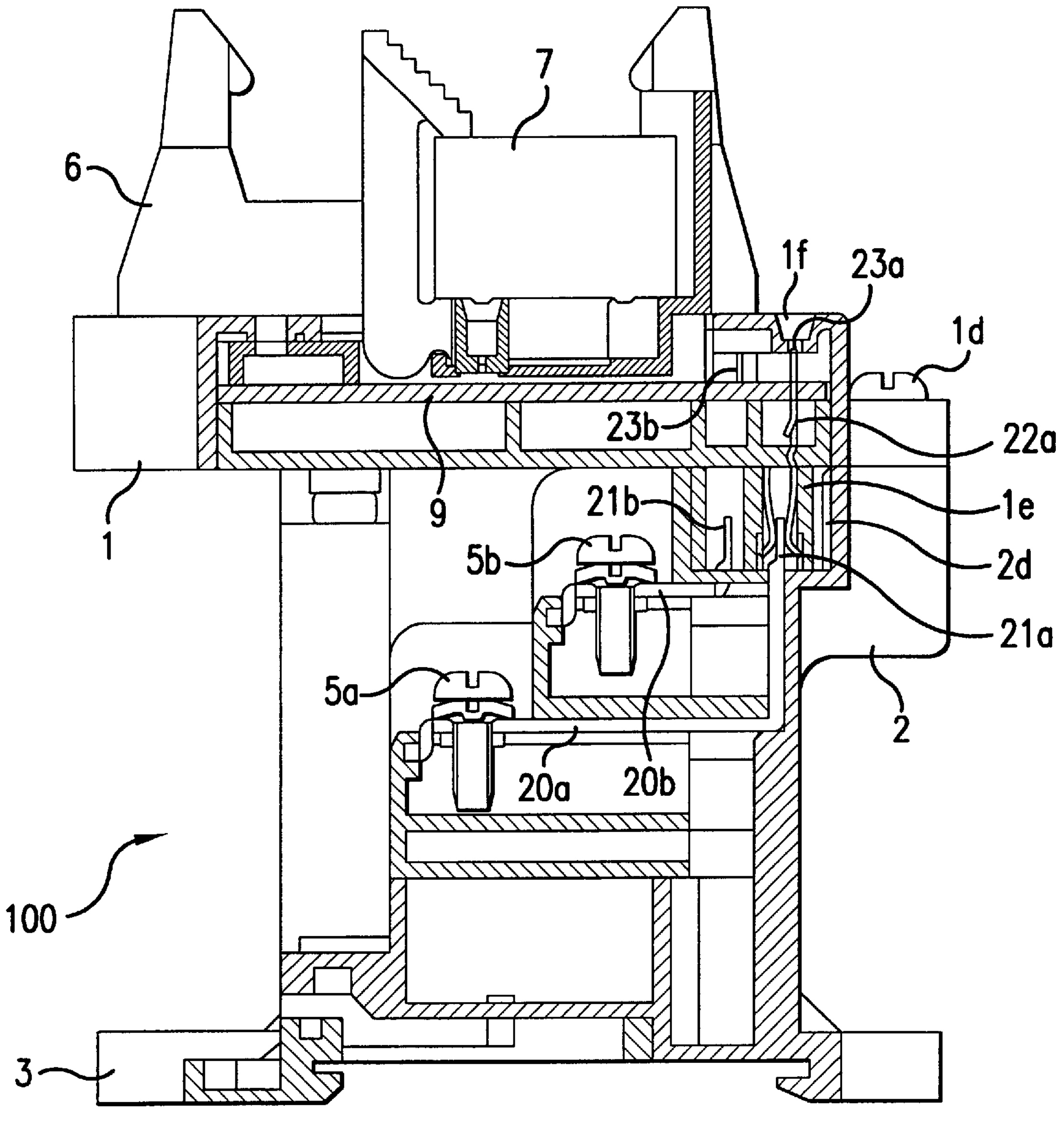
FIG. 15 is a sectional view of the relay terminal of FIG. 14 taken by a XV—XV cross line wherein an upper housing and a lower housing are combined.
Figure 16:
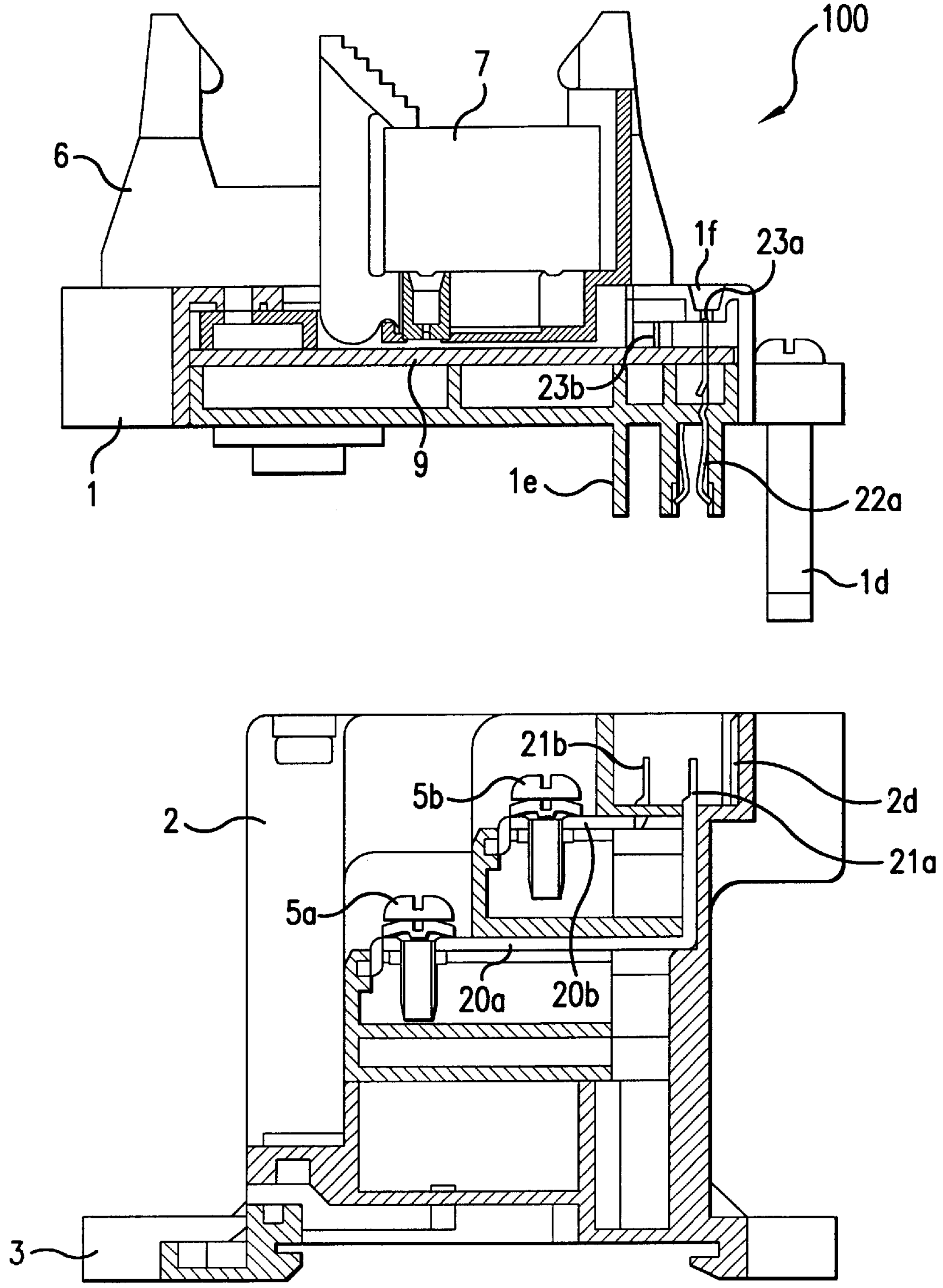
FIG. 16 is a sectional view of the relay terminal of FIG. 15 wherein the upper housing is separated from the lower housing.

As shown in FIG. 15 and FIG. 16, the terminal blocks 20*a* and 20*b* are connected with the terminals 5*a* and 5*b*, and horizontally extend rearward and are vertically bent upward to provide plug pins 21*a* and 21*b* at upper ends thereof that attend within a concavity 2*d* of the lower housing 2.

On the other hand, the upper housing 1 is provided with projections 1*e* to be engaged within the concavity 2*d*, and the projections 1*e* are inserted there within by socket pins 22*a* and 22*b* corresponding to the plug pins 21*a* and 21*b*. The socket pins 22*a* and 22*b* are packaged on the upper board 9, and the upper terminals of the socket pins 22*a* and 22*b* provide check terminals 23*a* and 23*b*. The socket pins 22*a* and 22*b* are connected with output terminals of the relays 7 by a wiring pattern.

Referring to FIG. 15, at the upper housing 1 and the lower housing 2 are being coupled, the plug pins 21*a* and 21*b* are electrically connect with the socket pins 22*a* and 22*b*, so that the check terminals 23*a* and 23*b* come into certain contact with the terminals 5*a* and 5*b* and the check terminals 23*a* and 23*b* are exposed on an external wall of the upper housing 1 as shown in FIG. 12, whereby an electrical check is easily performed even when the upper housing 1 is coupled with the lower housing 2. The check terminals 23*a* and 23*b* are accommodated in a step concave hole 1*f* disposed on an upper wall of the upper housing 1, thereby preventing the check terminals 23*a* and 23*b* from erroneously contacting metal pieces on an electrical conductor and ensuring a safe construction capable of completely preventing any electric shock.

Figure 18B:
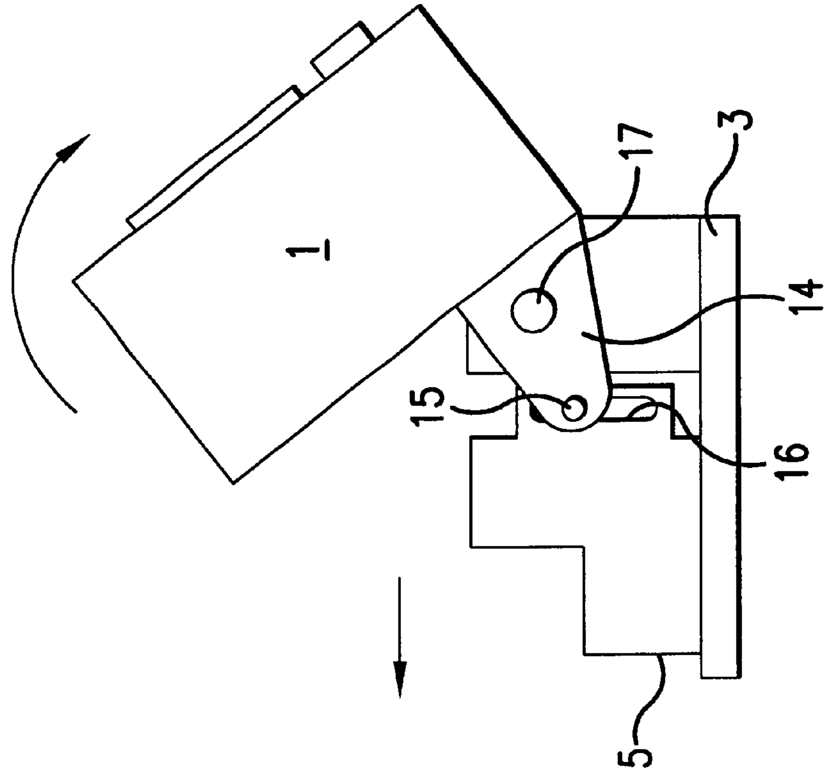
FIG. 18 is a side view of a modification of the relay terminal of the first embodiment.
Figure 18A:
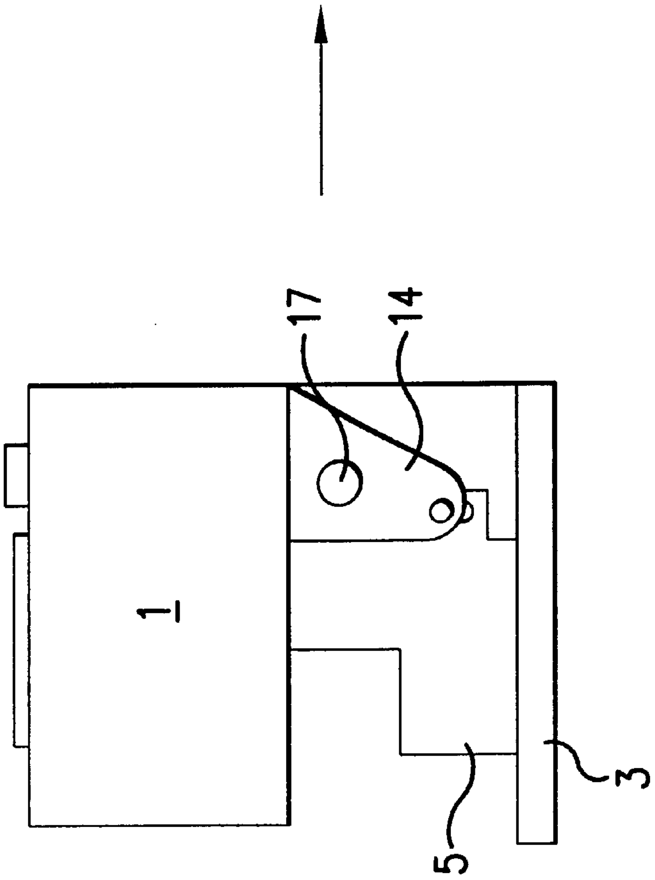

In FIG. 18, there is shown a modification of the swingable combination construction shown in FIGS. 1 to 9. In this modification, the terminal block 5 is so constructed to be to slide back and forth, an elongated hole 16 vertically disposed on the brackets of both sides of the terminal block are engaged with tip ends of the levers 14 of the upper housing 1, whereby the terminal block 5 is pushed forward as the upper housing 1 pivots at a rotational shaft 17 rearward, and the terminal block 5 is exposed from the above plane by the minimum turning angle. According to this construction, the turning angle of the upper housing 1 may be limited to the minimum, thereby minimizing space for backward swing.

Figure 19:
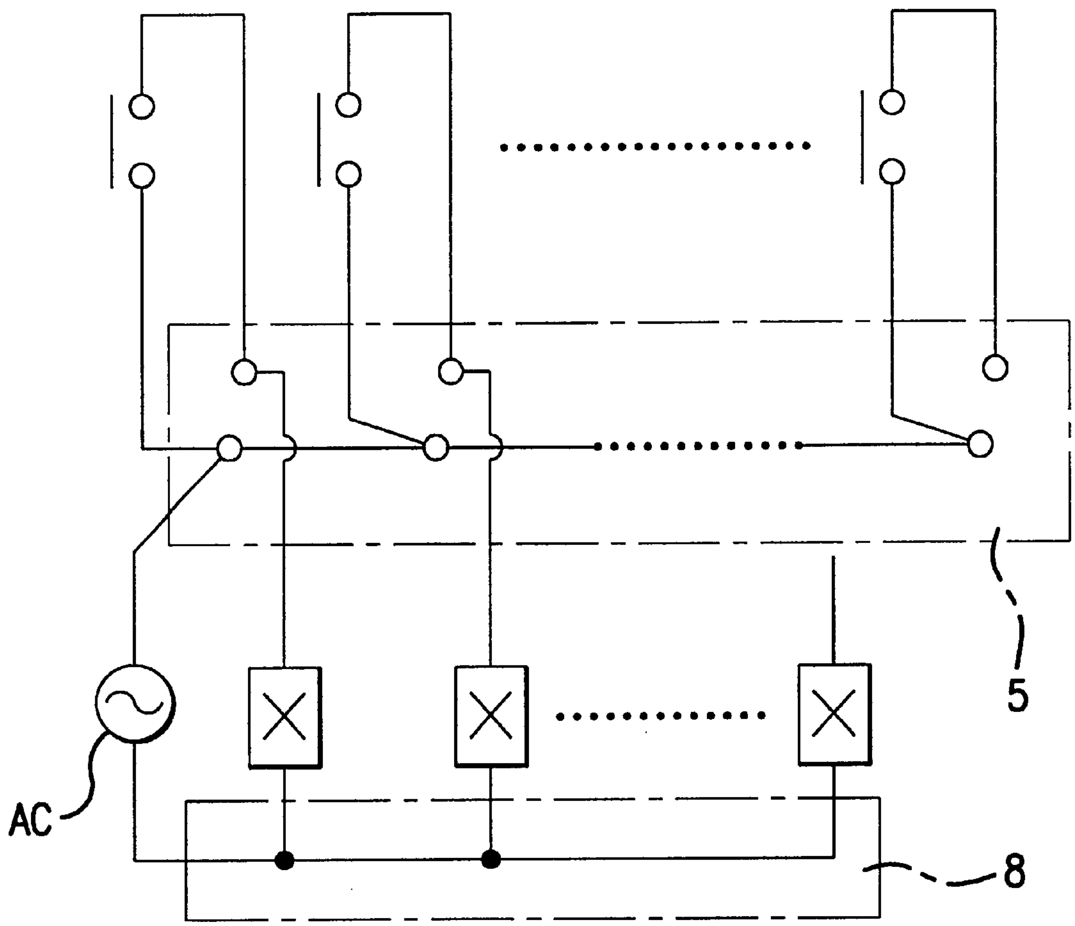
FIG. 19 is a schematic circuit diagram showing one example of the wiring of an enlarged terminal block.

Next, the employment of the mounting space 2*a* for the enlarged terminal block will be described hereinafter. With conventional relay terminals it is necessary to equip an external terminal beside the relay terminal to connect with a load power source, thereby reducing the package density. According to this invention, however, the mounting space 2*a* for an enlarged terminal block is disposed on the relay terminal itself to mount the enlarged terminal block 8, thereby avoiding the necessity of wasting space for an enlarged terminal block around the relay terminal. Though the circuit construction for employing the enlarged terminal block 8 to be connected with a load power source is well known, one example of the conventional circuits is shown in FIG. 19, which includes a permanent terminal block 5, an enlarged terminal block 8, an a.c. power source AC, and a load X.

Figure 20A:
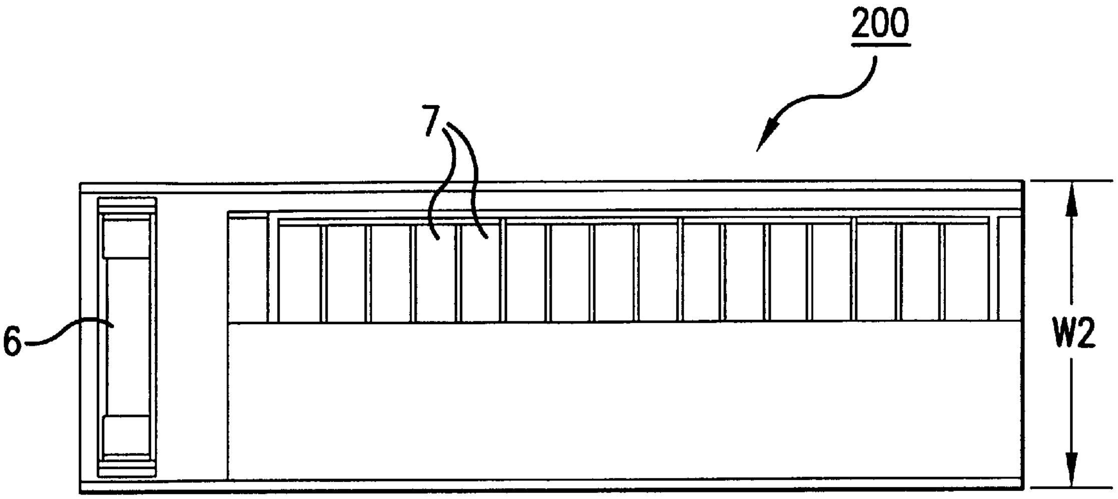
FIG. 20A is a top view of a conventional relay terminal and FIG. 20B is a relay terminal according to this invention, provided to show a comparison between their installation occupation areas.
Figure 20B:
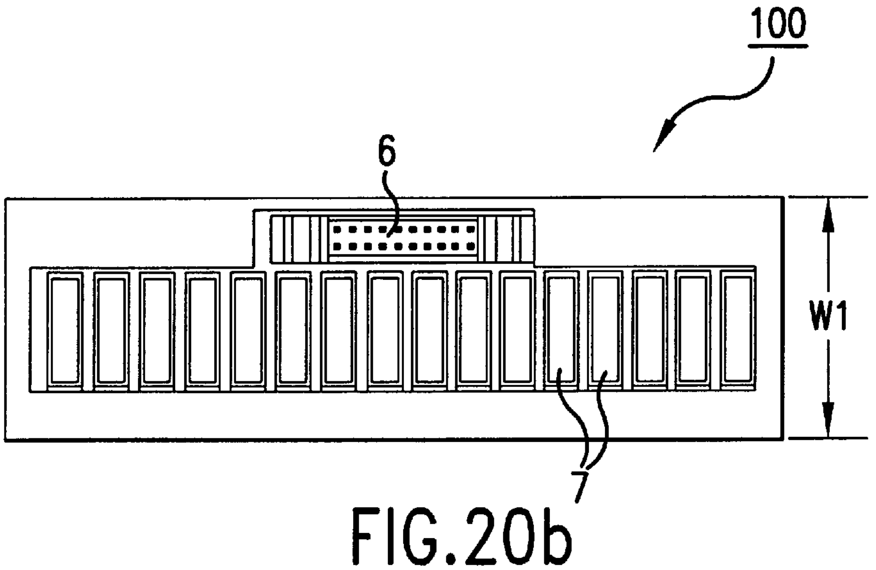

Finally, FIG. 20 shows the comparison in the space occupation rate between a conventional relay terminal 200 and the relay terminal of this invention. As clearly shown in FIG. 20, the width W1 in a vertical direction of the relay terminal 100 mounted on a vertical wall is extremely narrower than a width 2 of the conventional relay terminal 200, thereby improving the space occupation rate by the same degree. The conventional article 200 employs the relays 7 and the terminal blocks which are closely arranged in a forward and backward direction in a planar fashion, but the terminal relay of this invention employs a two-step overlapping construction.

Though electronic magnetic relays are employed as relays in the foregoing respective embodiments, it is needless to say that the relays according to this invention include solid state relays (SSR). Thus, a relay terminal according to this invention may have a small occupation area for mounting and an improved packaging density. While this invention has been described and illustrated with respect to certain embodiments which give satisfactory results, it will be understood by those skilled in the art, after understanding the purpose of the invention, that various other chances and modifications may be made without departing from the spirit and scope of the invention, and it is therefore, intended in the appended claims to cover all such changes and modifications.

What is claimed is:

1. A relay terminal connected to a controller and a load to be controlled, comprising:

a plurality of relays, a connector for inputting control signals of the controller to said relays and outputting output signals of the relays to the controller, a terminal block for making a connection to the load, an upper level holding member holding said plurality of relays, and a lower level holding member holding said terminal block, wherein the relays, the connector and the terminal are held together as a single unit, said unit having a two-leveled construction in which the terminal block is disposed on a lower level of the construction and the relays are disposed on an upper level of the construction such that the relays are located approximately above the terminal block, and wherein the two holding members are collectively set to one of a first configuration in which said relays cover an upper face of said terminal block and a second configuration in which said relays do not cover the upper face of said terminal block.

2. A relay terminal according to claim 1, wherein a portion of the terminal block housed within said lower level holding member extends to a connecting portion of said upper level holding member, said connecting portion has a conductive member therein that is conductive with said portion of the terminal block when both said holding members are positioned to take said first configuration, and an end of said conductive member is exposed on an external wall of said upper level holding member to provide a check terminal.

3. A relay terminal according to claim 2, wherein said extending portion of the terminal block serves as a plug pin extending to said connecting portion of said upper level holding member, and said conductive member in the connection portion serves as a socket for the pin.

4. A relay terminal according to one of claims 2 or 3, in which a tip end of said check terminal is accommodated by a stepped hole. concavely disposed on a surface of said upper level holding member.

5. A relay terminal according to one of claims 2 or 3, wherein the two holding members are separated to take the second configuration.

6. A relay terminal according to one of claims 2 or 3, wherein said lower level holding member is provided with a mounting space for an enlarged terminal block.

7. A relay terminal configured to be connected to an external controller and an external load which is controlled by the external controller, comprising:

a plurality of relays, a connector for inputting control signals of the controller to the relays and outputting out signals of the relays to the controller, and a terminals block having a plurality of terminals for making a connection to the external load, each of the plurality being connected to a corresponding relay of the plurality of relays, wherein the relays, the connector and the terminal block form a single unit, the unit having a two-leveled construction and the terminal block is disposed on a lower level of the construction and the relays are upper level of the construction so that the relays are located approximately above the terminal block.

* * * * *